United States Patent
Carlson

(10) Patent No.: US 9,198,540 B2
(45) Date of Patent: Dec. 1, 2015

(54) FOOD PROCESSOR WITH LOCKING BAIL HANDLE

(71) Applicant: Hamilton Beach Brands, Inc., Glen Allen, VA (US)

(72) Inventor: Drew Carlson, Henrico, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 38 days.

(21) Appl. No.: 13/957,593

(22) Filed: Aug. 2, 2013

(65) Prior Publication Data

US 2015/0037480 A1   Feb. 5, 2015

(51) Int. Cl.
   A47J 43/07    (2006.01)
   A47J 36/10    (2006.01)
   A47J 43/046   (2006.01)
   A47J 43/06    (2006.01)

(52) U.S. Cl.
   CPC .............. *A47J 43/0772* (2013.01); *A47J 36/10* (2013.01); *A47J 43/046* (2013.01); *A47J 43/06* (2013.01); *A47J 43/0716* (2013.01); *A47J 43/0766* (2013.01); *A47J 43/0794* (2013.01)

(58) Field of Classification Search
   CPC . A47J 43/0794; A47J 43/0783; A47J 43/046; A47J 43/0777; A47J 43/0722
   USPC ................ 241/282.1, 282.2, 92, 285.1, 285.3
   See application file for complete search history.

(56) References Cited

U.S. PATENT DOCUMENTS

| | | | |
|---|---|---|---|
| 1,361,601 A * | 12/1920 | Marcy | 241/179 |
| RE15,620 E * | 6/1923 | Marcy | 241/179 |
| 4,396,159 A | 8/1983 | Podell | |
| 4,691,870 A | 9/1987 | Fukunaga et al. | |
| D293,071 S | 12/1987 | Kim | |
| 6,474,578 B1 | 11/2002 | Gonneaud et al. | |
| 6,510,784 B1 | 1/2003 | Fevre et al. | |
| 6,513,966 B1 | 2/2003 | Gort-Barten et al. | |
| 6,540,394 B2 | 4/2003 | Juriga | |
| 6,568,843 B1 | 5/2003 | Lai | |
| 6,637,681 B1 | 10/2003 | Planca et al. | |
| 6,669,124 B2 * | 12/2003 | Lazzer et al. | 241/36 |
| 6,907,819 B2 * | 6/2005 | Kernan | 99/492 |
| 6,986,475 B2 * | 1/2006 | Wanat | 241/37.5 |
| 7,063,283 B2 | 6/2006 | Wanat | |
| 7,069,839 B2 | 7/2006 | Kernan | |
| 7,229,036 B2 * | 6/2007 | Carnevale et al. | 241/36 |
| 7,600,706 B2 | 10/2009 | Huang | |
| 7,841,764 B2 | 11/2010 | Wulf et al. | |
| 8,220,730 B2 * | 7/2012 | Ferraby et al. | 241/37.5 |
| 8,262,005 B2 * | 9/2012 | Garcia | 241/37.5 |
| 8,794,555 B2 * | 8/2014 | Garcia et al. | 241/92 |
| 2004/0042337 A1 | 3/2004 | Yiu et al. | |
| 2014/0231562 A1 * | 8/2014 | Potter et al. | 241/100 |

* cited by examiner

*Primary Examiner* — Faye Francis
(74) *Attorney, Agent, or Firm* — Alexander D. Raring

(57) ABSTRACT

A kitchen appliance for processing foodstuff includes a housing, a bowl, a bowl lid, and a bail handle. The bowl is removably mountable onto the housing and comprises an upper rim defining a mouth for selectively receiving a rotatable tool within the bowl. The bowl lid is removably mountable onto the upper rim of the bowl and comprises a top wall and a flange depending downwardly therefrom. The bail handle is pivotably affixed to opposing sides of the housing. The bail handle is pivotable between (1) a disengaged position in which the bowl lid may be removed from the bowl and in which the bowl may be removed from the housing and (2) an engaged position in which the bail handle applies downward pressure on the bowl lid to retain the bowl lid on the upper rim of the bowl and to retain the bowl on the housing.

8 Claims, 7 Drawing Sheets

FOOD PROCESSOR WITH LOCKING BAIL HANDLE

FIELD OF THE DISCLOSURE

The present disclosure relates generally to a kitchen appliance for processing foodstuff, and more particularly, to a food processor that includes a locking bail handle for assembling, using, and transporting the food processor.

BACKGROUND OF THE DISCLOSURE

A food processor is a specialized type of kitchen appliance distinct from other appliances such as blenders. Typically, a food processor includes a container that screws or twists onto a motor base and a lid that screws or twists onto the container. One or more buttons in the motor base allow a user to actuate the electric motor. Users can be deterred from using the food processor as it requires a twist assembly for use. It can be difficult to obtain the proper alignment between the various parts in order to assemble. The parts may be tight and make disassembly for cleaning problematic. In short, the structure or features that allow such components to be attached and/or function as a single unit can be difficult and/or awkward to utilize.

To address some of these shortcomings, a food processor has been developed in which the various components can simply be stacked without any need to screw or twist the components together. Such a food processor is disclosed in co-owned, co-pending U.S. patent application Ser. No. 13/707,640, filed Dec. 7, 2012, the contents of which are incorporated herein by reference in their entirety. However, the unorthodox construction can be confusing to consumers who attempt to lift the entire unit by the bowl handle or the components may tend to wobble during operation, especially when a large quantity of foodstuff or particularly viscous foodstuff has been placed in the container for processing.

Therefore, there is a need for a food processor that is relatively simple and easy to assemble and operate, and in which the components are securely retained during operation. The device of the present disclosure accomplishes at least the above objectives and overcomes the above-described or other disadvantages of conventional kitchen appliances.

BRIEF SUMMARY OF THE DISCLOSURE

Briefly stated, one aspect of the present disclosure is directed to a kitchen appliance for processing foodstuff including a housing, a bowl, a bowl lid, and a bail handle. The housing encloses a motor. The bowl is removably mountable onto the housing and comprises an upper rim defining a mouth for selectively receiving at least one rotatable tool within the bowl. The bowl lid is removably mountable onto the upper rim of the bowl and comprises a top wall and a flange depending downwardly therefrom. The lid does not include any securing mechanism selectively attached the lid to the bowl such as screw threads, bayonet locks, clamping mechanisms, and the like. The lid freely sits atop the bowl.

The bail handle is pivotably affixed to opposing sides of the housing. The bail handle is pivotable between (1) a disengaged position in which the bowl lid may be removed from the bowl and in which the bowl may be removed from the housing and (2) an engaged position in which the bail handle applies downward pressure on the bowl lid to retain the bowl lid on the upper rim of the bowl and to retain the bowl on the housing.

The bowl lid may further comprise a feed tube forming a passageway for feeding foodstuff into the bowl. The feed tube has a first end connected to a corresponding opening defined in the top wall of the bowl lid and a mouth adapted to receive foodstuff to be processed. The kitchen appliance may further comprise a food pusher, a control button on a portion of the housing, and an interlock mechanism. The food pusher is selectively insertable into the feed tube to push foodstuff through the feed tube and into the bowl. The interlock mechanism is movable between a disengaged position in which actuation of the motor is not permitted and an engaged position in which actuation of the motor is permitted. The interlock mechanism is in the disengaged position when the bowl lid is not retained on the upper rim of the bowl by the bail handle or when the food pusher is not inserted into the feed tube. The interlock mechanism is in the engaged position when the bowl lid is retained on the upper rim of the bowl by the bail handle and when the food pusher is inserted into the feed tube. The motor is actuated when the control button is actuated and when the interlock mechanism is engaged.

The feed tube may further comprise a generally vertical channel affixed to an outer wall of the feed tube. The bowl may further comprise a generally vertical channel affixed to an outer wall of the bowl and in vertical alignment with the feed tube channel when the bowl lid is properly positioned on the upper rim of the bowl. The housing may further comprise a switch mechanism to permit actuation of the motor. The interlock mechanism may comprise first, second, and third actuation members. The first actuation member is housed at least partially within the feed tube channel and movable between a first position and a second position. The first actuation member is biased toward the first position. The second actuation member is housed at least partially within the bowl channel and movable between a first position and a second position. The second actuation member is biased toward the first position. The third actuation member is housed at least partially within the housing and movable between a first position and a second position. In the first position, the third actuation member is spaced-apart from the switch mechanism to maintain the switch mechanism in an open position and prevent actuation of the motor. In the second position, the third actuation member engages the switch mechanism to permit actuation of the motor. The third actuation member is biased toward the first position. The first actuation member moves between the first position and the second position when the food pusher is inserted in the feed tube. The second actuation member moves between the first position and the second position when downward pressure is applied on the bowl lid by the bail handle and if the first actuation member is in the second position. The third actuation member moves between the first position and the second position when the second actuation member moves between the first position and the second position.

The bowl lid may further comprise at least one rib extending upwardly from the top wall such that the bail handle applies downward pressure on the bowl lid by applying downward pressure on the at least one rib. The at least one rib may comprise a notch for receiving a corresponding projection on the bail handle when the bail handle is in the engaged position.

The bail handle may comprise a contoured intermediate section and opposing end sections. The contoured intermediate section may include a raised portion that extends above the top wall of the bowl lid when the bail handle is in the engaged position to define a clearance space between the raised portion and the top wall of the bowl lid. The projection on the bail handle may project from a non-raised portion of the intermediate section of the bail handle.

Another aspect of the present disclosure is directed to a method of operating a kitchen appliance including mounting a bowl onto a housing enclosing a motor, inserting foodstuff into a mouth of the bowl, supplying power to the motor, mounting a lid onto an upper rim of the bowl that defines the mouth of the bowl, and pivoting a bail handle into an engaged position in which the bail handle applies downward pressure on the lid to retain the lid on the upper rim of the bowl and to retain the bowl on the housing.

Pivoting the bail handle into the engaged position in which the bail handle applies downward pressure on the lid may move an interlock mechanism into an engaged position in which actuation of the motor is permitted. The method may further comprises activating a control button on the housing to actuate the motor.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
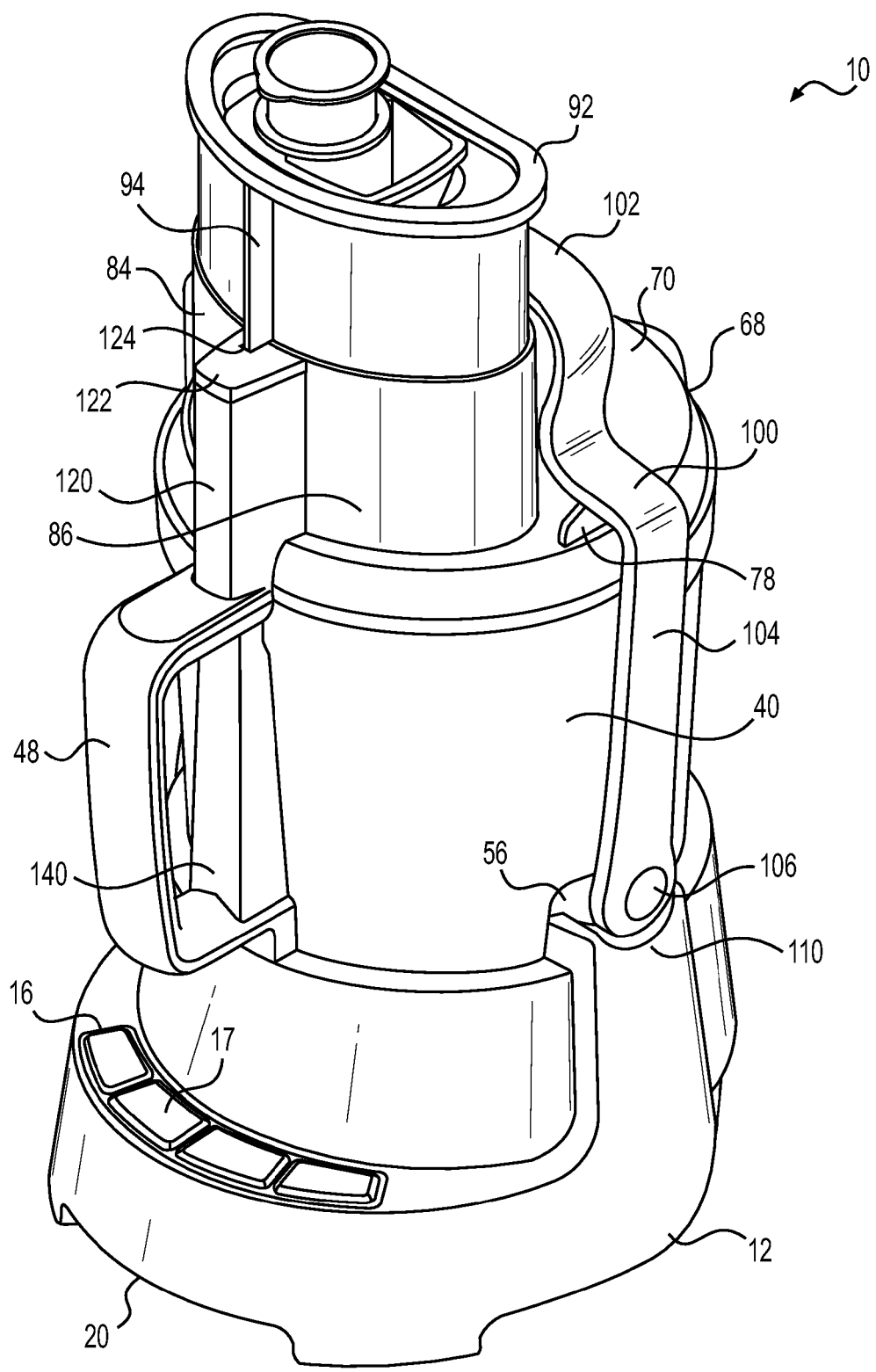
FIG. 1 is a front perspective view of a kitchen appliance for processing foodstuff, according to one embodiment of the present disclosure.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-7 illustrate a kitchen appliance 10 in accordance with a preferred embodiment of the present disclosure. The kitchen appliance 10 is intended or designed for processing, chopping, slicing, dicing, pureeing, or otherwise mixing foodstuff (not shown), such as meat(s), vegetables, soup, beverages, sauces and the like, or any combination thereof.

Figure 2:
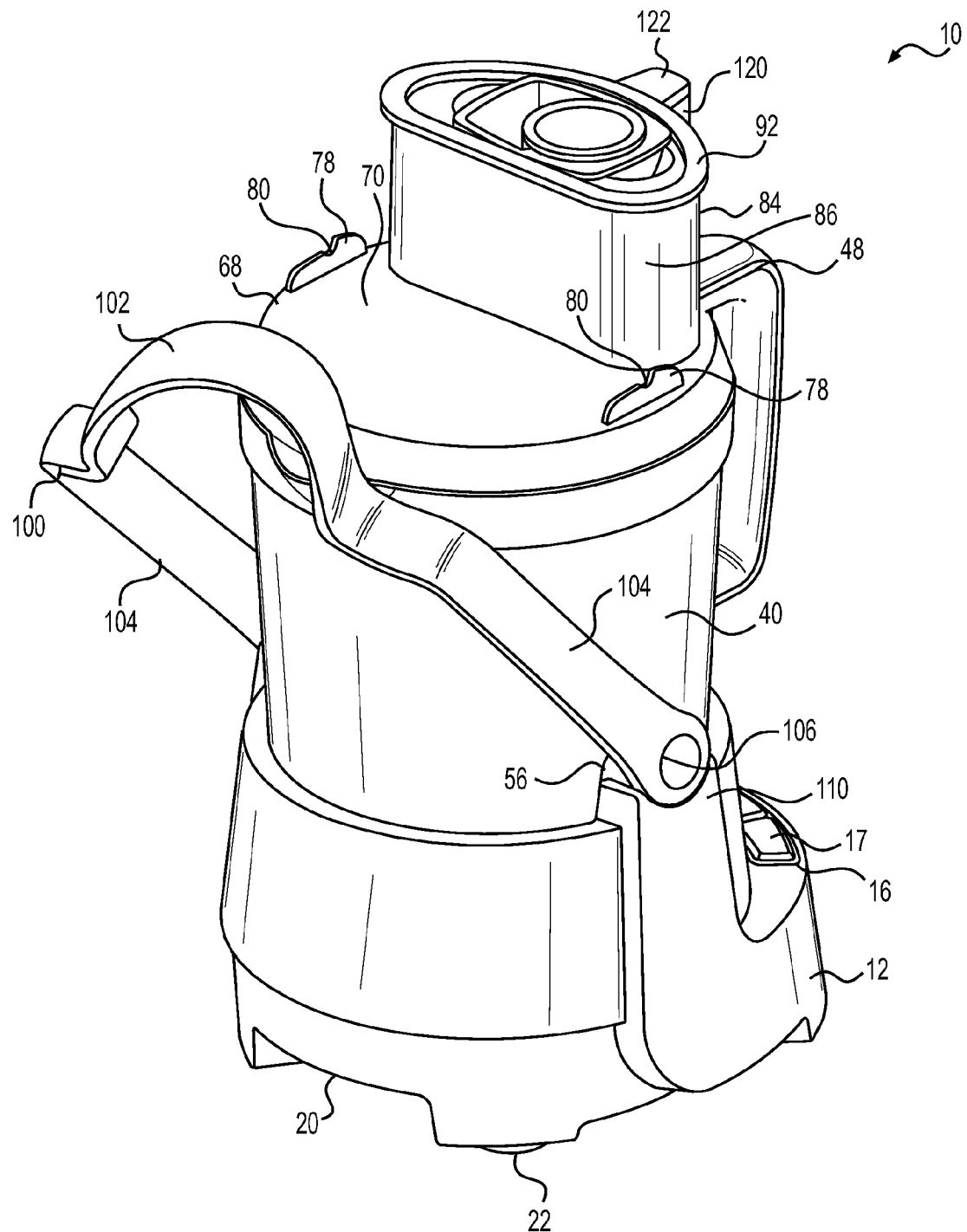
FIG. 2 is a rear perspective view of the kitchen appliance of FIG. 1.
Figure 3:
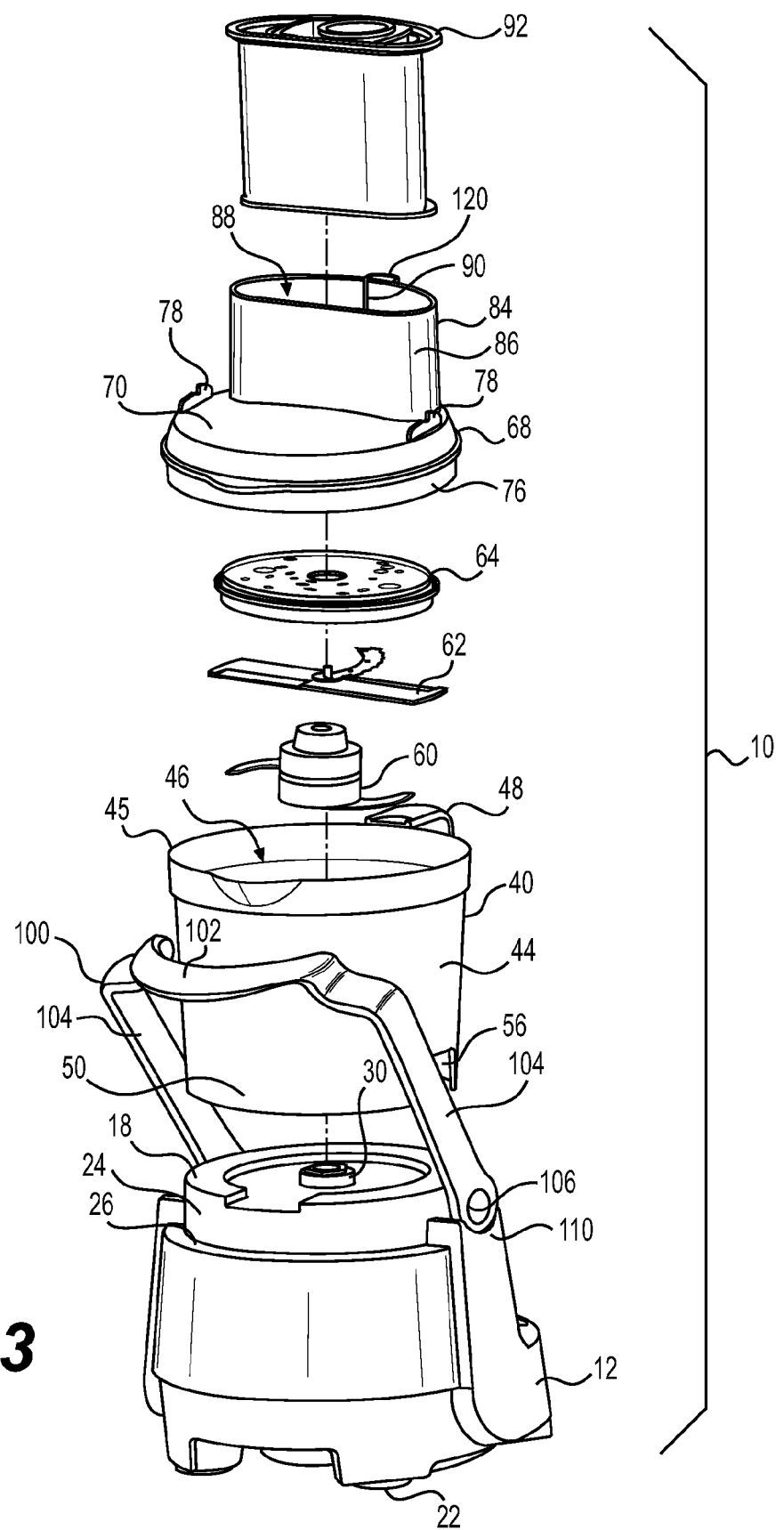
FIG. 3 is partially exploded perspective view of the kitchen appliance of FIG. 1.
Figure 4:
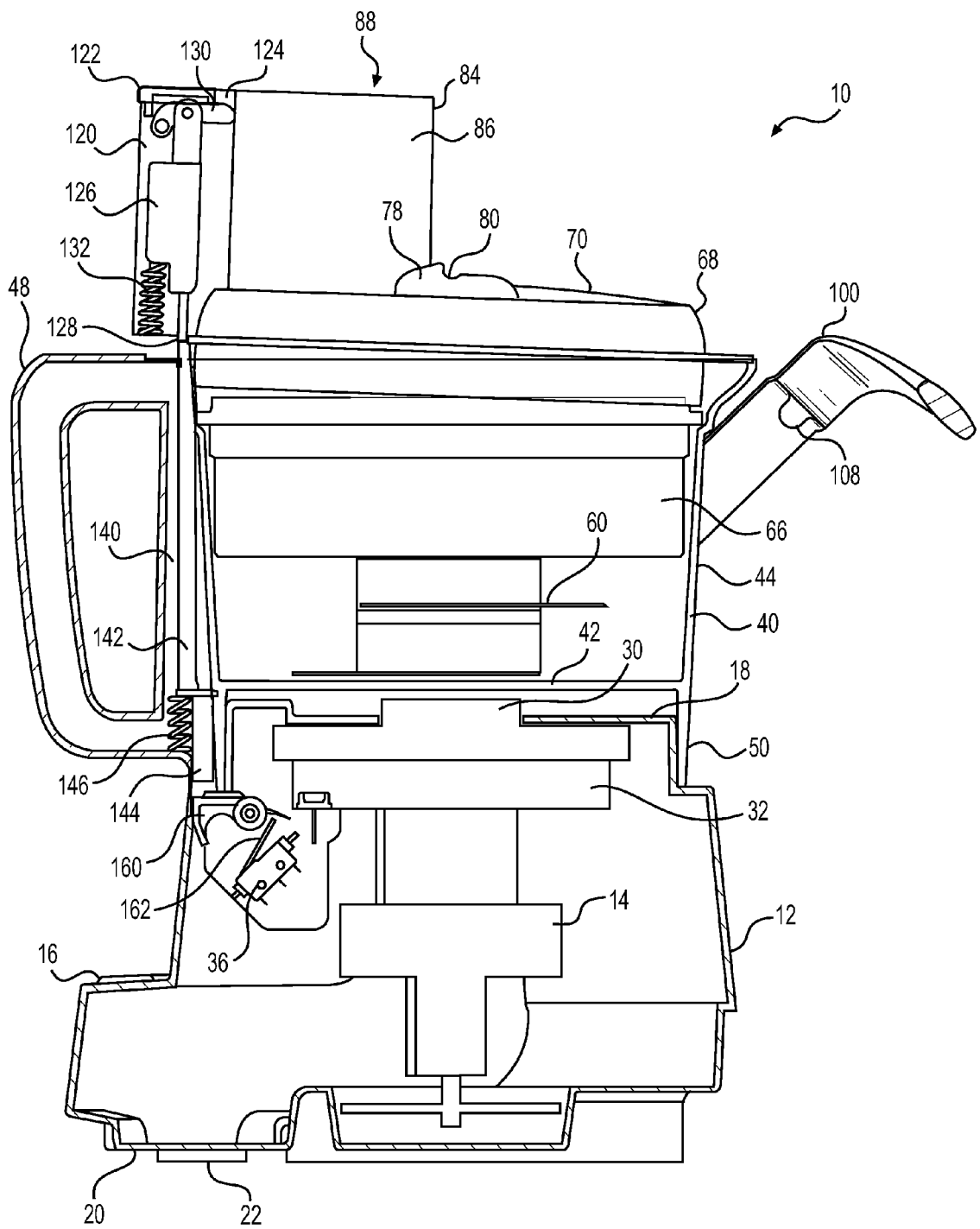
FIG. 4 is a cutaway side elevational view of the kitchen appliance of FIG. 1, wherein a safety interlock feature is shown in an open, disengaged, or deactivated position.
Figure 5:
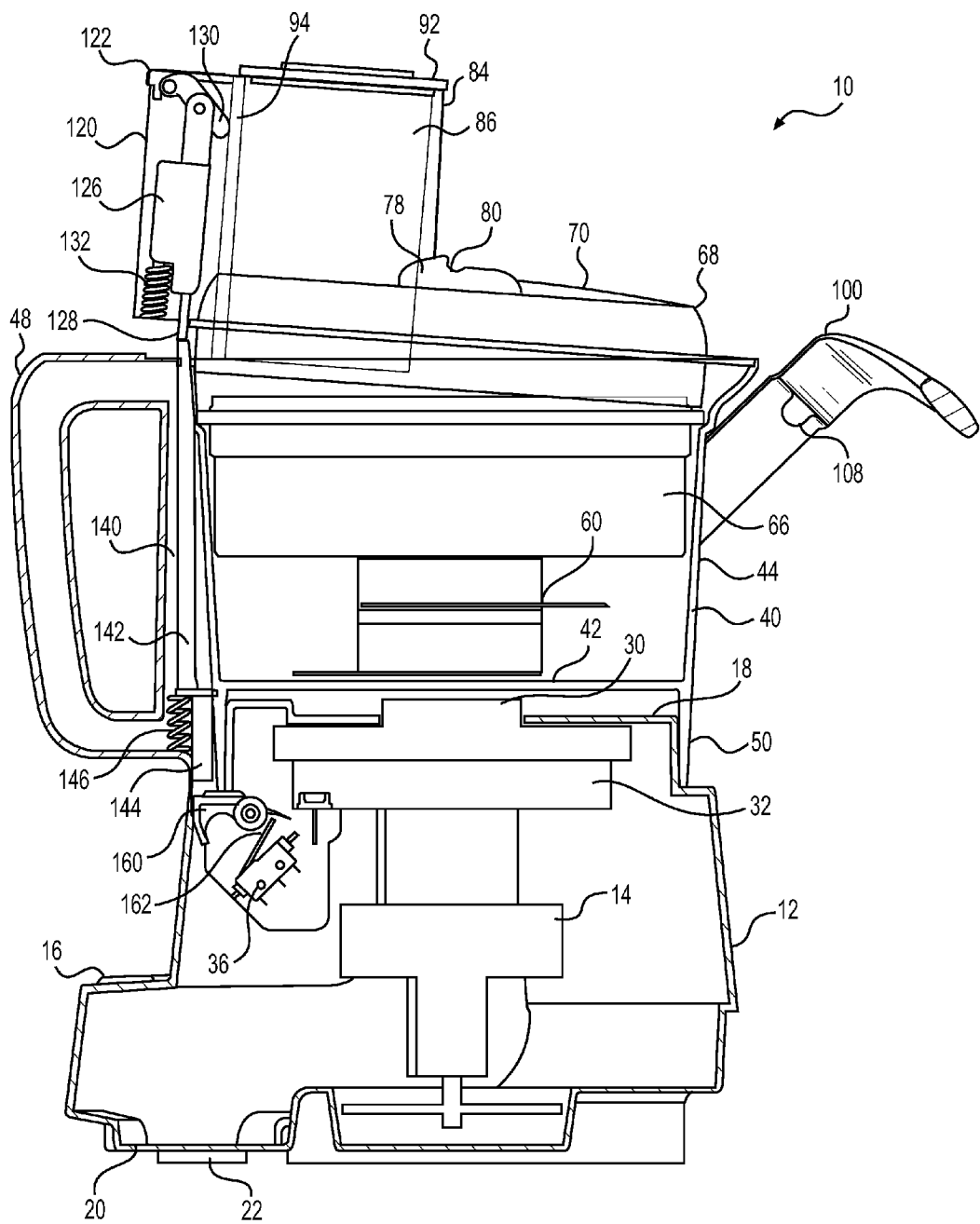
FIG. 5 is a cutaway side elevational view of the kitchen appliance of FIG. 1, wherein a safety interlock feature is shown in a partially closed, partially engaged, or partially activated position.
Figure 6:
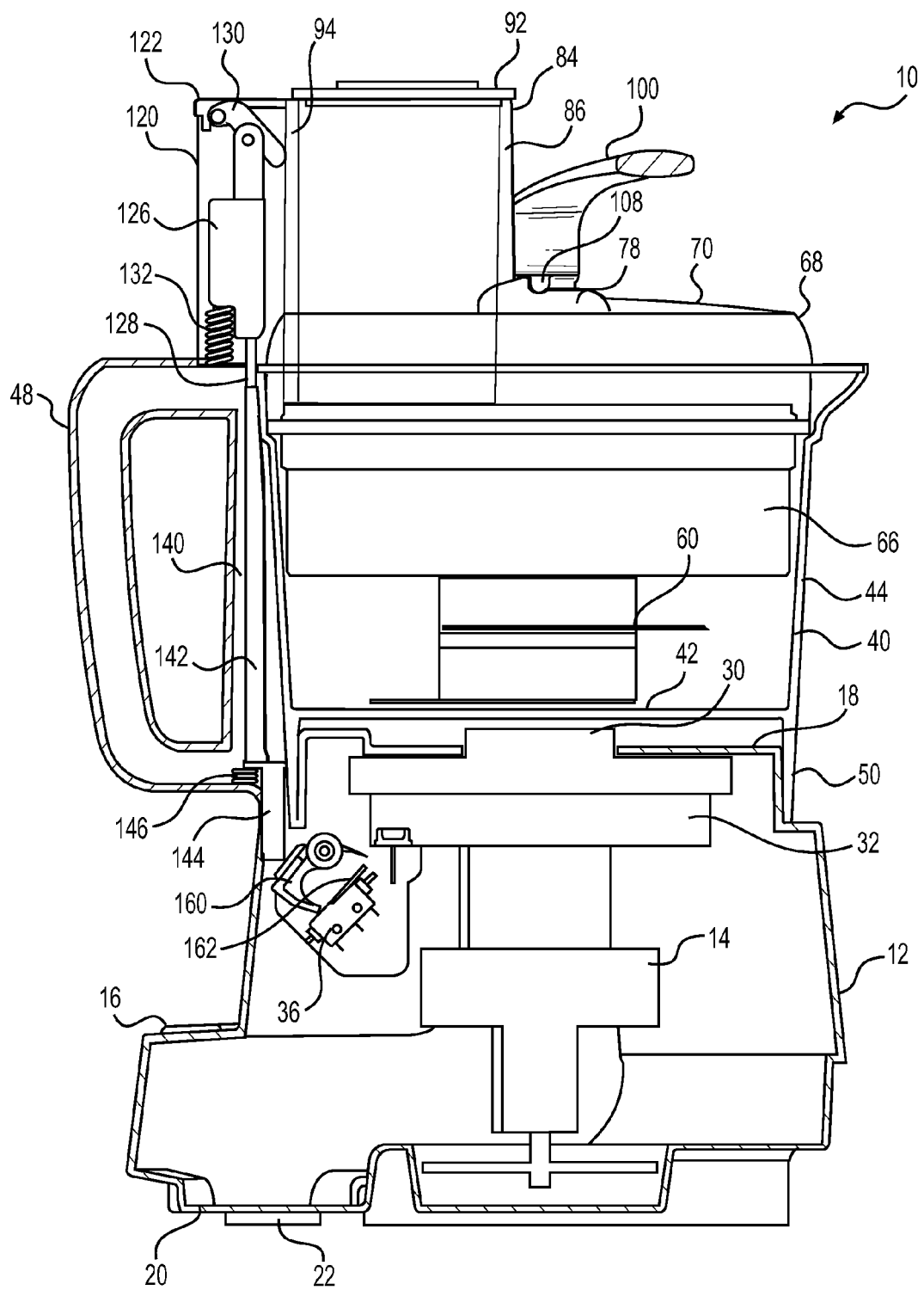
FIG. 6 is a cutaway side elevational view of the kitchen appliance of FIG. 1, wherein a safety interlock feature is shown in a closed, engaged, or activated position.
Figure 7:
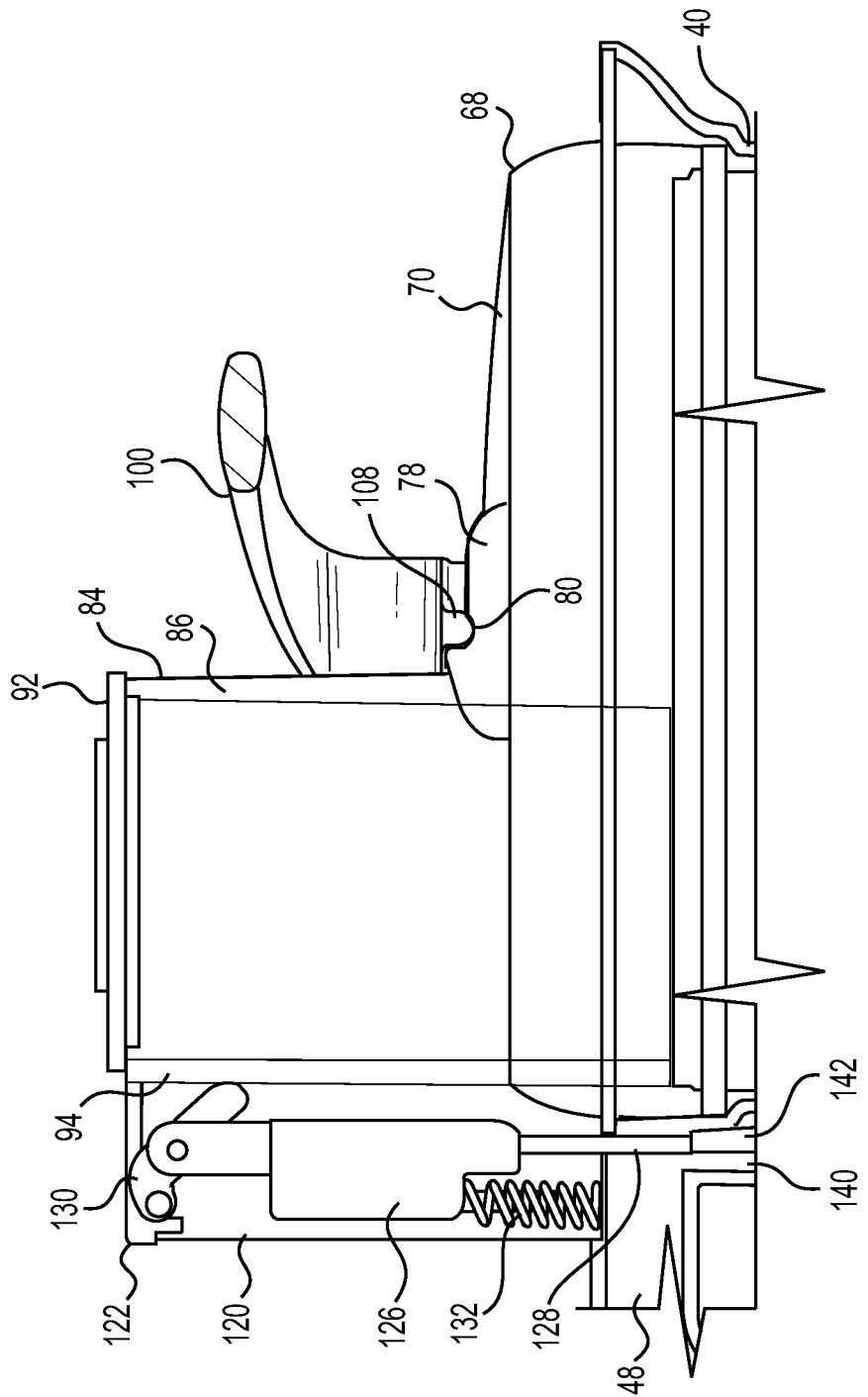
FIG. 7 is a partial close-up view of the cutaway side elevational view of FIG. 6.

Referring to FIGS. 1-7, the kitchen appliance 10 includes a housing 12 that at least partially encloses a motor 14 and at least one switch mechanism 36 (see FIGS. 4-6). The motor 14 may be a one-speed or multi-speed universal motor, an induction motor, or the like. Power may be supplied to the motor 14 from a conventional wall outlet (not shown) through a power cord (not shown). The switch mechanism 36 is preferably positioned proximate to the motor 14, and the switch mechanism 36 is preferably operably connected to the motor 14 to permit actuation of the motor 14, as discussed in more detail below. The switch mechanism 36 preferably includes a first, open or disengaged position (see FIGS. 4 and 5) and a second, closed or engaged position (see FIG. 6).

As shown in FIGS. 3-6, the housing 12 includes a first upper end 18 and an opposing second lower end 20. Two or more spaced-apart feet 22 may extend downwardly from the second lower end 20 of the housing 12 to support the kitchen appliance 10 on the support surface. However, the kitchen appliance 10 is not limited to inclusion of the feet 22. For example, a bottom surface of the second lower end 20 of the housing 12 may rest directly on the support surface.

Referring to FIG. 3, the housing 12 may have a generally cylindrical shape with a reduced diameter portion 24 proximate the first upper end 18 thereof. A ledge 26 preferably delineates the reduced diameter portion 24 from the remainder of the housing 12. The ledge 26 preferably extends generally, if not exactly, perpendicularly to the longitudinal axis of the kitchen appliance 10. The reduced diameter portion 24 of the housing 12 preferably has a generally constant or consistent diameter throughout a height thereof, such that an exterior surface of the reduced diameter portion 24 extends generally, if not exactly, parallel to the longitudinal axis of the kitchen appliance 10.

As shown in FIGS. 3-6, a drive hub 30 extends upwardly from the first upper end 18 of the housing 12. The drive hub 30 is operatively connected to and driven by the motor 14 through a gear reduction system 32 (see FIGS. 4-6), as understood by those of skill in the art. Although a gear reduction system is not necessary such as where an induction motor is used, for example. The drive hub 30 is rotatable with respect to the housing 12. The housing 12 may include a control panel 16 with one or more buttons or switches 17 (see FIG. 1), which allows a user to control operation of the motor 14.

The housing 12 may be constructed of a polymeric material, such as an injection molded acrylonitrile butadiene styrene (ABS) material. The ABS material may be desirable due to its relatively smooth surface finish, its ability to readily take on various colors, its high impact and crack resistance, and its ability to be plated with a metallic finish. However, the housing 12 is not limited to polymeric or injected molded ABS materials, and may be constructed of nearly any generally rigid material that is able to take on the general shape of the housing 12 and perform the functionality of the housing 12 described herein. For example, the housing 12, and any other components of the kitchen appliance 10, may be constructed of a metallic or like material or combination of materials. The housing 12 may be generally or completely opaque, translucent or transparent.

Referring again to FIGS. 1-7, a bowl or jar 40 is removably mountable to at least a portion of the first upper end 18 of the housing 12. The bowl 40 includes a base wall 42 and a side wall 44 extending upwardly therefrom. The base wall 42 extends generally, if not exactly, perpendicularly to the longitudinal axis of kitchen appliance 10. As shown in FIG. 3, the side wall 44 has an upper rim 45 that defines a mouth 46 opposite the base wall 42 for receiving one or more rotatable tools (as described further below) within the bowl 40. The bowl 40 includes a handle 48 that extends radially outwardly from at least a portion of an exterior surface of the side wall 44 of the bowl 40. A clutch-driven rotatable drive shaft (not illustrated) is affixed within the bowl 40 to the base wall 42. When the bowl 40 is mounted on the housing 12, the drive shaft couples to the drive hub 30 such that the drive shaft rotates when the drive hub 30 is rotated by the motor 14.

The bowl 40 preferably includes a skirt 50 extending downwardly from the base wall 42 opposite the mouth 46. The skirt 50 preferably extends generally, if not exactly, perpendicularly to the longitudinal axis of kitchen appliance 10. The skirt 50 preferably extends around an entire periphery of the bowl 40 and is preferably arcuate in shape to match a general circular or cylindrical shape of the bowl 40 when viewed from above or below. When the bowl 40 is properly mounted on to the housing 12, a free end of the skirt 50 preferably contacts or engages at least a portion of the ledge 26 of the housing 12.

As is evident from FIG. 3, the bowl 40 is removably mountable to the housing 12 by positioning at least a portion of the skirt 50 of the bowl 40 to surround at least a portion of the reduced diameter portion 24 of the housing 12. More preferably, when the bowl 40 is properly attached or mounted to the housing 12, the skirt 50 surrounds the entire reduced diameter portion 24. A diameter of the interior surface of the skirt 50 is preferably at least slightly greater than a diameter of the exterior surface of the reduced diameter portion 24. As a result, the skirt 50 can surround the reduced diameter portion 24 in a relatively close manner, such that the bowl 40 is stable when properly positioned on the housing 12.

As shown in FIGS. 1-3, two notches 56 are defined in opposing sides of the skirt 50. Each notch 56 cooperates with a corresponding raised area 110 of the housing 12 when the bowl 40 is properly mounted onto the housing 12. The raised areas 110 are where the bail handle 100 (discussed further below) is affixed to the housing 12. In particular, when the bowl 40 is properly positioned on the housing 12, each raised area 110 of the housing 12 is preferably at least partially received within one of the notches 50 of the skirt 50. As a result, the bowl 40 is preferably properly attached to the housing 12 by moving the bowl 40 in a vertical manner generally, if not exactly, parallel to the longitudinal axis of the kitchen appliance 10. In other words, it is preferred that the bowl 40 is properly attached to the housing 12 by moving the bowl 40 linearly downwardly on to the housing 12, such that no twisting of the bowl 40 relative to the housing 12 is required once the bowl 40 contacts the housing 12. Such a method of assembling the kitchen appliance 10 is generally simpler and easier than prior art methods.

The bowl 40 may be constructed of a relatively rigid polymeric material, such as a molded styrene acrylonitrile (SAN) material. However, the bowl 40 is are not limited to constructions using molded SAN material and may be constructed of nearly any polymeric, metallic, glass or like material that is able to form the desired shape(s) and withstand the normal operating conditions described herein. The bowl 40 any other features or complementary components may be may be generally or completely opaque, translucent, or transparent. In FIGS. 1-3, the bowl 40 is illustrated as opaque, while in FIGS. 4-6 the bowl 40 is illustrated as transparent.

Referring to FIGS. 3-6, the kitchen appliance 10 preferably includes the at least one rotatable tool, and preferably two or more separate and distinct rotatable tools or cutting mechanisms. In use, the rotatable tool(s) are mounted on the drive shaft. In FIG. 3, a mixing blade 60, a slicing blade 62, and a blade disk 64 are illustrated. The slicing blade 62 and blade disk 64 are typically housed in a housing 66. A dicing grid (not shown) is optional, and if included would also typically be housed in the housing 66. FIG. 3 illustrates the mixing blade 60, slicing blade 62, and blade disk 64 while omitting the housing, while FIGS. 4-6 illustrate the mixing blade 60 and housing 66 only. The rotatable tools are sized and shaped so as to be positioned entirely within the space surrounded by the bowl lid 68 and the bowl 40 when the bowl lid 68 is properly mounted to the bowl 40. Preferably two rotatable tools are not simultaneously operated or rotated within the bowl 40.

Referring again to FIGS. 1-7, a bowl lid 68 is removably mountable onto the upper rim 45 of the bowl 40 to thereby close the mouth 46. The bowl lid 68 preferably includes a top wall 70 and a flange 76 depending downwardly therefrom. The top wall 70 may have at least a slightly arcuate cross-sectional shape when viewed from the side. The flange 76 depends downwardly from the top wall 70 at an angle that is at least generally parallel with the longitudinal axis of kitchen appliance 10. One or more, and preferably two, ribs 78 project upwardly from opposing edges of the top wall 70 of bowl lid 68. A rounded notch or recess 80 is defined in each bowl lid rib 78 (for engaging with corresponding projections on the bail handle 100 as discussed further below).

When viewed from above and/or below, the bowl lid 68 preferably has a generally circular shape to match the generally circular shape of the bowl 40. In contrast to conventional bowl lids, the bowl lid 68 freely rests on the bowl 40 and is not secured to the bowl via twisting the bowl lid 68 relative to the bowl 40 once the bowl lid 68 contacts the bowl 40. Instead, the bowl lid 68 is preferably vertically movable with respect to the bowl 40 along the longitudinal axis of kitchen appliance 10 to attach and/or remove the bowl lid 68 from the bowl 40. Such a method of assembling the kitchen appliance 10 is generally simpler and easier than prior art methods. The bowl lid 68 is then selectively secured to the bowl 40 by the bail handle 100 (as discussed further below).

The bowl lid 68 preferably includes a feed tube 84 affixed to the top wall 70. The feed tube 84 has a feed tube wall 86 forming a passageway for feeding foodstuff into the bowl. One end of the feed tube 84 is connected to a corresponding opening (not shown) defined in the top wall 70 of the bowl lid 68, and the other end of the feed tube 84 forms a mouth 88 adapted to receive foodstuff to be processed. A generally vertical slot 90 (see FIG. 3) is defined in the feed tube wall 84 and is open to a generally vertical channel 120 affixed to the outer wall of the feed tube 84 (as discussed further below).

A food pusher 92 is selectively insertable into the feed tube 84 to push foodstuff through the feed tube 84 and into the bowl 40. The food pusher 92 is shown inserted in the feed tube 84 in FIGS. 2 and 5-7, and partially inserted in FIG. 1. A generally vertical spine 94 (see FIG. 1) projects outward substantially perpendicularly from the feed tube wall 84. When the food pusher 92 is inserted into the feed tube 84, the spine 94 protrudes through the slot 90 into the channel 120 to engage part of an interlock mechanism (as discussed further below).

A bail handle 100 is pivotably affixed to opposing sides of the housing at pivot points 106. Each pivot point 106 is adjacent a corresponding raised area 110 of the housing 12. The bail handle 100 pivots between a disengaged position (see FIGS. 2-5) and an engaged position (see FIGS. 1, 6, and 7). In the disengaged position, the bowl lid 68 may be removed from the bowl 40 and the bowl 40 may be removed from the housing 12. In the engaged position, the bail handle 100 applies downward pressure on the bowl lid 68 to retain the bowl lid 68 on the upper rim 45 of the bowl 40 and to retain the bowl 40 on the housing 12.

The bail handle 100 comprises a contoured intermediate section 102 and opposing end sections 104. The contoured intermediate section 102 has a raised portion that extends above the top wall 70 of the bowl lid 68 when the bail handle 100 is in the engaged position to define a clearance space between the raised portion and the top wall of the bowl lid. The clearance space enables a user's hand to grasp the contoured intermediate section 102 when the bail handle 100 is in the engaged position, thereby enabling the user to engage or disengage the bail handle 100 and to easily lift and carry the kitchen appliance 10 when the bail handle 100 is in the engaged position.

At least one, and preferable two, projections 108 (see FIGS. 4-7) extend downward from the intermediate section 102 of the bail handle 100. In a preferable embodiment, the projections 108 extend downward from the non-raised portion of the intermediate section 102 of the bail handle 100. The number of projections will correspond to the number of ribs 78 on the bowl lid 68. The position of the projections 108 corresponds with the positions of the ribs 78 on the bowl lid 68. Thus, as the bail handle 100 is moved into the engaged position, the projections 108 come in contact with and apply downward pressure on the ribs 78, thereby applying corresponding downward pressure on the bowl lid 68. The downward pressure on the bowl lid 68 causes the bowl lid 68 to fully and securely close (best seen in FIG. 6). As the bail handle 100 reaches the fully engaged position, the recess 80 of each rib 78 receives the corresponding projection 108 of the bail handle 100, thereby providing tactile feedback to the user that the bail handle 100 has reached the fully engaged position and increasing (at least slightly) the amount of force needed to move the bail handle 100 from the fully engaged position.

The presence and use of a bail handle for a food processor is heretofore unknown. In fact, such a bail handle is unnecessary for conventional food processors. As described above, conventional food processors have lids that lock in place with clamps or a twist lock. Additionally, conventional food processors have bowls that lock to the housing (either directly, or via the locking lid). Such locking bowls on conventional food processors enable a user to lift and carry the food processor via the bowl handle. As such, conventional food processors have no need for a bail handle for securing the lid to the bowl and/or the bowl to the housing or for lifting and carrying the food processor.

The kitchen appliance 10 comprises an interlock mechanism. The interlock mechanism has a disengaged position in which actuation of the motor is not permitted and an engaged position in which actuation of the motor is permitted. As described further below, the interlock mechanism is in the disengaged position when the bowl lid 68 is not retained on the upper rim 45 of the bowl 40 by the bail handle 100 or when the food pusher 92 is not inserted into the feed tube 84. Further, the interlock mechanism is in the engaged position when the bowl lid 68 is retained on the upper rim 45 of the bowl 40 by the bail handle 100 and when the food pusher 92 is inserted into the feed tube 84. The motor 14 may only be actuated when the appropriate control button 17 is engaged and when the interlock mechanism is engaged.

The interlock mechanism of embodiments of the present disclosure is divided into three groups of components that all cooperate to provide the desired interlock function. The first group of interlock components corresponds to the bowl lid 68, feed tube 84, and food pusher 92. The second group of interlock components corresponds to the bowl 40. The third group of interlock components corresponds to the housing 12.

Referring again to FIGS. 1-7, an extension 120 projects from the wall 86 of the feed tube 84 to define a channel within the extension 120. A cap 122 closes off the top end of extension 120. Cap 122 has a notch 124 to enable the spine 94 of the food pusher 92 to enter the extension 120 (described further below). A generally elongated first actuation member 126 is substantially or completely enclosed within extension 120. A protruding portion 128 projects from a bottom end of the first actuation member 126. A top end of the first actuation member 126 is affixed to a pivot arm 130. The first actuation member 126 is movable with respect to the extension 120 and/or the feed tube 84 between a first position (see FIG. 4) and a second position (see FIGS. 5-7). The first and second positions are preferably spaced-apart along the longitudinal axis of the kitchen appliance 10. A biasing member 132, such as a coil spring, preferably biases the first actuation member 126 vertically upwardly to the first position. Downward movement of the first actuation member 126 (i.e., from the first position to the second position) is caused by the pivot arm 130 pivoting downward, which in turn is caused by the spine 94 of the food pusher 92 pushing down on the pivot arm 130 as the spine 94 enters the extension 120.

The first actuation member 126 is in the first position when the food pusher 92 is not inserted into the feed tube 84. The first actuation member 126 is in the second position when the food pusher 92 is inserted in the feed tube 84. In the first position (see FIG. 4), the protruding portion 128 of the first actuation member 126 either does not protrude (not shown) from extension 120 or protrudes only slightly from extension 120 (see FIG. 4). In the first position, the protruding portion 128 of the first actuation member 126 causes the corresponding side of the bowl lid 68 to be slightly elevated above the rim 45 of the bowl 40 (see FIG. 4). In the first position, the protruding portion 128 of the first actuation member 126 does not affect the second group of actuation components (described further below). In the second position (see FIGS. 5-7), the protruding portion 128 of the first actuation member 126 protrudes significantly more from extension 120 than in the first position (see FIGS. 5-7). In this second position, the protruding portion 128 of the first actuation member 126 causes the corresponding side of the bowl lid 68 to be more elevated above the rim 45 of the bowl 40 than in the first position (see FIG. 5), unless the bowl lid 68 is pushed down by the bail handle 100 (described further below). In this second position, the protruding portion 128 of the first actuation member 126 does not affect the second group of actuation components, again unless the bowl lid 68 is pushed down by the bail handle 100 (described further below).

For the second group of interlock components, an extension 140 projects from the wall 44 of the bowl 40 to define a channel within the extension 140. A generally elongated second actuation member 142 is substantially or completely enclosed within extension 140. A protruding portion 144 projects from a bottom end of the second actuation member 142. A top end of the second actuation member 142 is typically flush with the top end of extension 140. The second actuation member 142 is movable with respect to the extension 140 and/or the bowl 40 between a first position (see FIGS. 4-5) and a second position (see FIGS. 6-7). The first and second positions are preferably spaced-apart along the longitudinal axis of the kitchen appliance 10. A biasing member 146, such as a coil spring, preferably biases the second actuation member 142 vertically upwardly to the first position.

The second actuation member 142 is in the first position when the food pusher 92 is not in the feed tube 84 (and therefore the first actuation member 126 is in the first position and not in a position to be able to push the second actuation member downward into the second position) or when the bowl lid 68 is not pushed down by the bail handle 100. The second actuation member 142 moves to the second position when the bowl lid 68 is pushed down by the bail handle 100 as the bail handle 100 moves from the disengaged position (see FIGS. 2-5) to the engaged position (see FIGS. 1, 6-7), if the food pusher 92 is already in the feed tube 84 (and therefore the first actuation member 126 is already in the second position). Alternatively, the second actuation member 142 moves to the second position when the food pusher 92 is inserted into the feed tube 84 (and therefore the first actuation member 126 moves downward to the second position), if the bowl lid 68 is already pushed down by the bail handle 100. In other words, the food pusher 92 must be in the feed tube 84 and the bowl lid 68 must be pushed down by the bail handle 100 for the second actuation member 142 to be in the second position.

In the first position (see FIGS. 4-5), the protruding portion 144 of the second actuation member 142 either does not protrude (not shown) from extension 140 or protrudes only slightly from extension 140 (see FIGS. 4-5). In the first position (see FIGS. 4-5), the protruding portion 144 of the second actuation member 142 does not affect the third group of actuation components (described further below). In the second position (see FIGS. 6-7), the protruding portion 144 of the second actuation member 142 protrudes significantly more from extension 140 than in the first position (see FIGS. 6-7). In the second position, the protruding portion 128 of the second actuation member 142 causes the corresponding side of the bowl lid 68 to be more elevated above the rim 45 of the bowl 40 than in the first position (see FIG. 5), unless the bowl lid 68 is pushed down by the bail handle 100. In the second position, the protruding portion 128 of the second actuation member 142 does not affect the third group of actuation components, again unless the bowl lid 68 is pushed down by the bail handle 100 (described further below).

The third group of interlock components is substantially or completely enclosed within the housing 12. A third actuation member 160 is pivotable or rotatable between a first position (see FIGS. 4-5) and a second position (see FIG. 6). Optionally, a third actuation member may move linearly within the housing 12, rather than pivotably or rotatably, to engage the switch mechanism 36. In the first position, the third actuation member 160 is spaced-apart from a contact arm 162 of the switch mechanism 36 to maintain the switch mechanism 36 in a first, open or disengaged position and thereby prevent actuation of the motor 14. In the second position, at least a portion of the third actuation member 160 contacts or engages contact arm 162 of the switch mechanism 36, thereby causing the switch mechanism to be in a second, closed or engaged position that will permit actuation of the motor 14 (however, motor 14 will typically not actuate unless button 17 (or similar) is also engaged). A biasing member (not shown) preferably biases the third actuation member 160 clockwise to the first position. A biasing member (not shown), such as a coil spring, preferably biases the contact arm 162 upward to the first position.

In the first position, at least a portion of the third actuation member 160 is adjacent an opening defined in the housing (not shown). The opening in the housing is aligned with the protruding portion 144 of the second actuation member 142 when the bowl 40 is mounted on the housing 12, such that the protruding portion 144 of the second actuation member 142 protrudes through the opening and into the housing 12 when the second actuation member 142 is moved into the second position. Thus, when the second actuation member 142 is moved into the second position, the second actuation member 142 contacts the third actuation member 160 and causes the third actuation member 160 to rotate counterclockwise from the first position to the second position, thereby causing the third actuation member 160 to engage contact arm 162 of the switch mechanism 36 and engage the switch mechanism to permit actuation of the motor 14.

Preferably, the first, second, and third groups of interlock components together provide a safety interlock feature of the kitchen application 10, such that the motor 14 cannot be actuated unless certain components are properly assembled and/or configured. For example, it is preferred that if the bowl 40 is not properly attached to the housing 12, and the bowl lid 68 is not properly attached and fully secured (via the bail handle 100) to the bowl 40, and the food pusher 92 is not in the feed tube 84, then the motor 14 cannot be actuated. When the kitchen appliance 10 is in the fully assembled configuration (see FIG. 6), such that the bowl lid 68, the bowl 40 and the housing 12 are properly assembled and secured by the bail handle 100 and the food pusher 92 is in the feed tube 84, and when power is supplied to the motor 14, it is preferred that the motor 14 can be actuated by engaging the control panel 16 of the housing 12.

A preferred method of assembling and operating the kitchen appliance 10 to process foodstuff therein includes placing the housing 12 on a support surface. The bowl 40 is preferably attached or mounted onto the first upper end 18 of the housing 12 by moving the bowl 40 vertically downward from above (i.e., along the longitudinal axis of kitchen appliance 10). The above-described movement of the bowl 40 with respect to the housing 12 allows each notch 56 of the bowl 40 to engage one of the raised areas 110 of the housing 12. A rotatable tool (such as mixing blade 60) is preferably inserted into and/or attached to the bowl 40, either before or after the bowl 40 is mounted onto the housing 12. Foodstuff to be processed, blended and/or mixed may be placed in the bowl 40, before or after the bowl 40 is mounted on to the housing 12 (or alternatively, foodstuff to be processed may be inserted into the feed tube 84 after the bowl lid 68 is mounted on the bowl 40). Power may be supplied to the motor 14. The bowl lid 68 is preferably attached onto the upper rim 45 of the bowl 40 by moving the bowl lid 68 vertically downward from above (i.e., along the longitudinal axis), such that at least a portion of the lid flange 76 is inserted into upper rim 45 of the bowl 40. The bail handle 100 is then pivoted upward from the disengaged position to the engaged position. The bail handle 100 pushes the bowl lid 68 securely and fully onto the bowl 40. The food pusher 92 is inserted into the feed tube 84. When the food pusher 92 is inserted into the feed tube 84, the first actuation member 126 is moved from the first position to the second position, which in turn moves the second actuation member 142 from the first position to the second position, which in turn moves the third actuation member 160 from the first position to the second position, which in turn engages switch mechanism 36 to permit actuation of the motor 14.

An alternative method of assembling and operating the kitchen appliance 10 to process foodstuff therein includes placing the housing 12 on a support surface. The bowl 40 is preferably attached or mounted onto the first upper end 18 of the housing 12 by moving the bowl 40 vertically downward from above (i.e., along the longitudinal axis of kitchen appliance 10). The above-described movement of the bowl 40 with respect to the housing 12 allows each notch 56 of the bowl 40 to engage one of the raised areas 110 of the housing 12. A rotatable tool (such as mixing blade 60) is preferably inserted into and/or attached to the bowl 40, either before or after the bowl 40 is mounted onto the housing 12. Foodstuff to be processed, blended and/or mixed may be placed in the bowl 40, before or after the bowl 40 is mounted on to the housing 12 (or alternatively, foodstuff to be processed may be inserted into the feed tube 84 after the bowl lid 68 is mounted on the bowl 40). Power may be supplied to the motor 14. The bowl lid 68 is preferably attached onto the upper rim 45 of the bowl 40 by moving the bowl lid 68 vertically downward from above (i.e., along the longitudinal axis), such that at least a portion of the lid flange 76 is inserted into upper rim 45 of the bowl 40. The food pusher 92 is inserted into the feed tube 84 (the food pusher 92 may be inserted into the feed tube 84 before or after the bowl lid 68 is mounted on the bowl 40). When the food pusher 92 is inserted into the feed tube 84, the first actuation member 126 is moved from the first position to the second position. However, no other components of the interlock mechanism are engaged at this point. The bail handle 100 is then pivoted upward from the disengaged position to the engaged position. The bail handle 100 pushes the bowl lid 68 securely and fully onto the bowl 40. This downward movement of the bowl lid 68 causes the first actuation member 126 (which is already in the second position) to move the second actuation member 142 from the first position to the second position, which in turn moves the third actuation member 160 from the first position to the second position, which in turn engages switch mechanism 36 to permit actuation of the motor 14.

The above-described steps (of either method of assembly) allow the safety interlock feature to be activated or engaged, thereby allowing a user to control operation of the motor 14 through the relatively simple steps of engaging the bail handle 100, inserting the food pusher 92 into the feed tube 84, and engaging the button 17 on the control panel 16. The above-described method of assembling and processing is not limited to the precise order of operations described, and one or more of the steps may occur before or after another.

In an optional embodiment of the present disclosure, the bowl lid 68 may comprise one or more gaskets (not illustrated). Such gaskets may not be necessary for lids that use conventional locking and attaching mechanisms. For the subject apparatus, the gasket could provide a better seal between the bowl lid 68 and the bowl 40 allowing a user to process a greater quantify of food or low viscosity material fluids without leakage. Such a gasket may be mounted to the flange 76 of the bowl lid 68. In particular, the gasket may be mounted to the flange 76 adjacent where the flange 76 depends from the top wall 70. Such a gasket will typically cause the flange 76 of the bowl lid 68 to fit more snugly within the bowl 40. It is possible that the bowl lid 40 may be retained on the bowl 40 via the friction fit of flange 76 once the bail handle applies mechanical force but after the bial handle is removed to the disengaged position. Because the bowl lid 40 may be retained on the bowl 40 even when the bail handle 100 is moved to the disengaged position, the above-described interlock mechanism may be insufficient to prevent actuation of the motor 14 in such a situation. As such, when the bowl lid 68 comprises an optional gasket, it may be desirable to include an additional interlock mechanism in the kitchen appliance. Specifically, such an additional interlock mechanism may comprise a position sensor that detects the position of the bail handle 100. Such an additional interlock mechanism may only permit actuation of the motor 14 if the bail handle 100 is in the engaged or vertical position. If the bail handle 100 is not in the engaged position, the additional interlock mechanism would not permit actuation of the motor 14. Typically, the additional interlock mechanism would only permit actuation of the motor 14 if the bail handle 100 is in a fully engaged position and even a slight movement away from the fully engaged position would cause the additional interlock mechanism to not permit actuation of the motor 14. Such an additional interlock mechanism would typically work in conjunction with the above-described interlock mechanism such that both interlock mechanisms would need to be engaged in order for actuation of the motor 14 to be permitted.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

I claim:

1. A kitchen appliance for processing foodstuff comprising:
   a housing enclosing a motor;
   a bowl removably mountable onto the housing, the bowl comprising an upper rim defining a mouth for selectively receiving at least one rotatable tool within the bowl;
   a bowl lid removably mountable onto the upper rim of the bowl, the bowl lid comprising a top wall and a flange depending downwardly therefrom; and
   a bail handle pivotably affixed to opposing sides of the housing, the bail handle being pivotable between (1) a disengaged position in which the bowl lid may be removed from the bowl and in which the bowl may be removed from the housing and (2) an engaged position in which the bail handle applies downward pressure on the bowl lid to retain the bowl lid on the upper rim of the bowl and to retain the bowl on the housing, the bowl lid further comprising at least one rib extending upwardly from the top wall such that the bail handle applies downward pressure on the bowl lid by applying downward pressure on the at least one rib.

2. The kitchen appliance according to claim 1, wherein the bowl lid further comprises a feed tube forming a passageway for feeding foodstuff into the bowl, the feed tube having a first end connected to a corresponding opening defined in the top wall of the bowl lid and a mouth adapted to receive foodstuff to be processed;
   wherein the kitchen appliance further comprises:
      a food pusher selectively insertable into the feed tube to push foodstuff through the feed tube and into the bowl;
      a control button on a portion of the housing;
      an interlock mechanism movable between a disengaged position in which actuation of the motor is not permitted and an engaged position in which actuation of the motor is permitted, the interlock mechanism being in the disengaged position when the bowl lid is not retained on the upper rim of the bowl by the bail handle or when the food pusher is not inserted into the feed tube, the interlock mechanism being in the engaged position when the bowl lid is retained on the upper rim of the bowl by the bail handle and when the food pusher is inserted into the feed tube; and
   wherein the motor is actuated when the control button is actuated and when the interlock mechanism is engaged.

3. The kitchen appliance according to claim 2, wherein the feed tube further comprises a generally vertical channel affixed to an outer wall of the feed tube;
   the bowl further comprising a generally vertical channel affixed to an outer wall of the bowl and in vertical alignment with the feed tube channel when the bowl lid is properly positioned on the upper rim of the bowl;

the housing further comprising a switch mechanism to permit actuation of the motor;

wherein the interlock mechanism comprises:
- a first actuation member housed at least partially within the feed tube channel and movable between a first position and a second position, the first actuation member being biased toward the first position;
- a second actuation member housed at least partially within the bowl channel and movable between a first position and a second position, the second actuation member being biased toward the first position;
- a third actuation member housed at least partially within the housing and movable between a first position and a second position, in the first position the third actuation member being spaced-apart from the switch mechanism to maintain the switch mechanism in an open position and prevent actuation of the motor, in the second position the third actuation member engaging the switch mechanism to permit actuation of the motor, the third actuation member being biased toward the first position;

wherein the first actuation member moves between the first position and the second position when the food pusher is inserted in the feed tube;

wherein the second actuation member moves between the first position and the second position when downward pressure is applied on the bowl lid by the bail handle and if the first actuation member is in the second position; and wherein the third actuation member moves between the first position and the second position when the second actuation member moves between the first position and the second position.

4. The kitchen appliance according to claim 1, wherein the at least one rib comprises a notch for receiving a corresponding projection on the bail handle when the bail handle is in the engaged position.

5. The kitchen appliance according to claim 4, wherein the bail handle comprises a contoured intermediate section and opposing end sections, the contoured intermediate section including a raised portion that extends above the top wall of the bowl lid when the bail handle is in the engaged position to define a clearance space between the raised portion and the top wall of the bowl lid.

6. The kitchen appliance according to claim 5, wherein the projection on the bail handle projects from a non-raised portion of the intermediate section of the bail handle.

7. A method of operating a kitchen appliance, the method comprising:
- mounting a bowl onto a housing enclosing a motor;
- inserting foodstuff into a mouth of the bowl;
- supplying power to the motor;
- mounting a lid onto an upper rim of the bowl that defines the mouth of the bowl;
- pivoting a bail handle that is pivotably affixed to opposing sides of the housing into an engaged position in which the bail handle applies downward pressure on the lid to retain the lid on the upper rim of the bowl and to retain the bowl on the housing; and
- the step of pivoting a bail handle into the engaged position moves an interlock mechanism into an engaged position in which actuation of the motor is permitted.

8. The method of operating a kitchen appliance according to claim 7, wherein the method further comprises activating a control button on the housing to actuate the motor.

* * * * *